US011133546B2

(12) United States Patent
Lee et al.

(10) Patent No.: US 11,133,546 B2
(45) Date of Patent: Sep. 28, 2021

(54) BATTERY AND ELECTRONIC DEVICE HAVING THE SAME

(71) Applicant: Samsung Electronics Co., Ltd., Gyeonggi-do (KR)

(72) Inventors: Younghoon Lee, Gyeonggi-do (KR); Jonghwa Kim, Gyeonggi-do (KR); Hyunmi Cheong, Gyeonggi-do (KR); Daehyuk Chin, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/226,841

(22) Filed: Dec. 20, 2018

(65) Prior Publication Data

US 2019/0214610 A1 Jul. 11, 2019

(30) Foreign Application Priority Data

Jan. 11, 2018 (KR) ........................ 10-2018-0003997

(51) Int. Cl.
*H01M 50/124* (2021.01)
*H01M 10/0587* (2010.01)
(Continued)

(52) U.S. Cl.
CPC ....... *H01M 50/124* (2021.01); *H01M 10/045* (2013.01); *H01M 10/0431* (2013.01);
(Continued)

(58) Field of Classification Search
None
See application file for complete search history.

(56) References Cited

U.S. PATENT DOCUMENTS 5,196,280 A * 3/1993 Gyenes ............... H01M 50/213
429/144
9,246,139 B2 1/2016 Hong
(Continued)

FOREIGN PATENT DOCUMENTS

EP 2375472 A1 10/2011
JP 2002-151031 A 5/2002
(Continued)

OTHER PUBLICATIONS

International Search Report dated Apr. 1, 2019.
European Search Report dated Jan. 21, 2021.

*Primary Examiner* — Miriam Stagg
*Assistant Examiner* — Alex Rae
(74) *Attorney, Agent, or Firm* — Cha & Reiter, LLC

(57) ABSTRACT

An electronic device and battery included therein are disclosed. The device includes a battery which itself comprises a jelly-roll structure having a rolled stack of a cathode, a separator, and an anode; an outer cover layer enclosing surfaces of the jelly-roll; and a pouch sealing the jelly-roll and the outer cover layer. The jelly-roll includes a first surface, a second surface disposed in a opposite direction, a third surface corresponding to one side of the rolled stack and connecting the first surface and the second surface, and a fourth surface corresponding to other side of the rolled stack, connecting the first surface and the second surface, and disposed in a direction opposite to the third surface. The outer cover layer includes a first portion, a second portion, a third portion, and a fourth portion bonded to first, second, third and fourth surfaces, respectively.

20 Claims, 19 Drawing Sheets

(51) Int. Cl.
  *H01M 10/04* (2006.01)
  *H01M 50/10* (2021.01)
  *H01M 50/183* (2021.01)
  *H01M 50/538* (2021.01)

(52) U.S. Cl.
  CPC ....... *H01M 10/0587* (2013.01); *H01M 50/10* (2021.01); *H01M 50/183* (2021.01); *H01M 50/538* (2021.01); *H01M 2220/30* (2013.01)

(56) References Cited

U.S. PATENT DOCUMENTS

| | | |
|---|---|---|
| 2003/0087150 A1 | 5/2003 | Chung |
| 2004/0142236 A1 | 7/2004 | Kim et al. |
| 2010/0035132 A1 | 2/2010 | Park |
| 2011/0244318 A1 | 10/2011 | Cho et al. |
| 2014/0329138 A1* | 11/2014 | Park .................. H01M 10/0431 429/164 |
| 2015/0171383 A1* | 6/2015 | Ahn .................... H01M 50/411 429/94 |
| 2015/0288022 A1 | 10/2015 | Lee |

FOREIGN PATENT DOCUMENTS

| | | |
|---|---|---|
| JP | 2017-204489 A | 11/2017 |
| KR | 10-2008-0069376 A | 7/2008 |
| KR | 10-1219252 B1 | 1/2013 |
| KR | 10-1773333 B1 | 9/2017 |

* cited by examiner

BATTERY AND ELECTRONIC DEVICE HAVING THE SAME

CROSS-REFERENCE TO RELATED APPLICATION(S)

This application is based on and claims priority under 35 U.S.C. § 119 to Korean Patent Application No. 10-2018-0003997, filed on Jan. 11, 2018, in the Korean Intellectual Property Office, the disclosure of which is incorporated by reference herein in its entirety.

TECHNICAL FIELD

The present disclosure relates to a battery and an electronic device having the same.

BACKGROUND

Normally, a battery used in an electronic device can be manufactured in various forms by various methods. For example, the battery may be rolled and packed in the form of a "jelly-roll."

Components of the battery are typically arranged in a narrow space. Thus, when external shocks or other circumstances are encountered, the batteries may incur some form of damage resulting in unexpected problems arising in the battery components. For example, electrodes may begin to interfere with each other or with other components, such as a separator. In short, physical, electrical, or chemical malfunctions may result.

SUMMARY

Certain embodiments of the present disclosure are to provide a structure for protecting a jelly-roll structure of a battery.

According to an embodiment of the present disclosure, an electronic device may include a jelly-roll structure including a cathode, a separator, and an anode the cathode, the separator and the anode wound about a rectangular plane, a first polymeric layer, a pouch sealing the jelly-roll structure and the first polymeric layer, wherein the jelly-roll structure includes a first surface facing a first direction, the first surface parallel with the rectangular plane, a second surface facing a second direction opposite the first direction, a third surface connecting the first surface and the second surface, the third surface facing a third direction perpendicular to the rectangular plane, the first direction, and the second direction, a fourth surface connecting the first surface and the second surface, the fourth surface facing a fourth direction opposite the third direction, and wherein the first polymeric layer includes a first portion attached to substantially an entire area of the first surface, a second portion having an opening, the second portion attached to the second surface, a third portion attached to a part of the third surface, and connecting the first portion and the second portion, and a fourth portion attached to a part of the fourth surface, and connecting the first portion and the second portion.

According to an embodiment of the present disclosure, a battery includes a jelly-roll structure including a stack of a cathode, a separator, and an anode which are disposed in a rolled stack, an outer cover layer enclosing at least some surfaces of the jelly-roll structure, a pouch sealing the jelly-roll structure and the outer cover layer, wherein the jelly-roll structure includes a first surface, a second surface disposed in a direction opposite to the first surface, a third surface corresponding to a first side of the rolled stack of the jelly-roll structure, the third surface connecting the first surface and the second surface, and a fourth surface corresponding to a second side of the rolled stack of the jelly-roll structure, the fourth surface connecting the first surface and the second surface and disposed in a direction opposite to the third surface, and wherein the outer cover layer includes a first portion bonded to the first surface, a second portion bonded to the second surface, a third portion bonded to a part of the third surface and connected to the first and second portions, and a fourth portion bonded to a part of the fourth surface.

The battery of the electronic device according to embodiments of the present disclosure can reduce the movement of the jelly-roll structure inside the battery and thereby prevent the damage or deformation of the jelly-roll structure even though an unexpected external force is applied.

DETAILED DESCRIPTION

Figure 1:
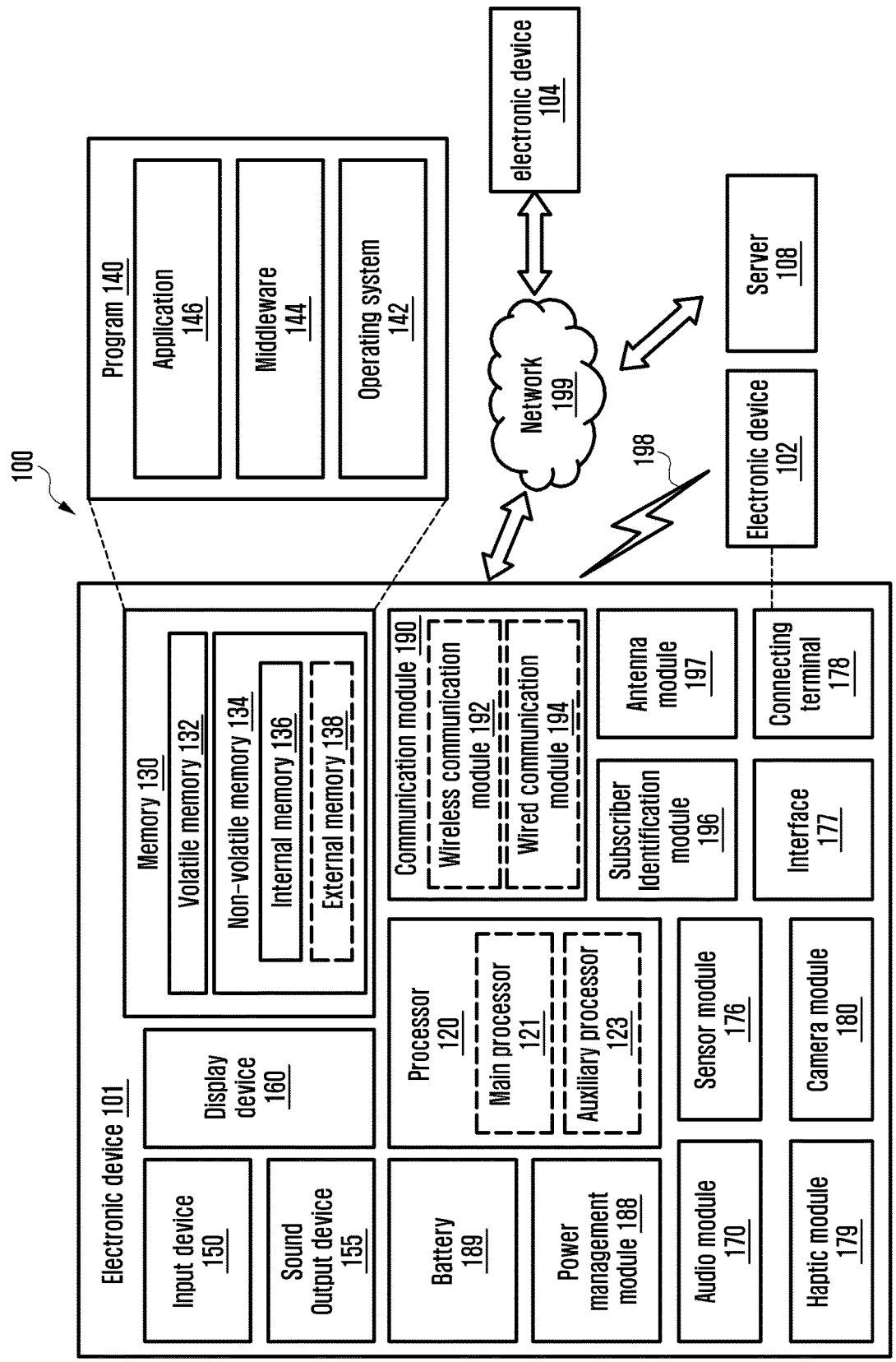
FIG. 1 is a block diagram of an electronic device in a network environment according to certain embodiments of the present disclosure.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
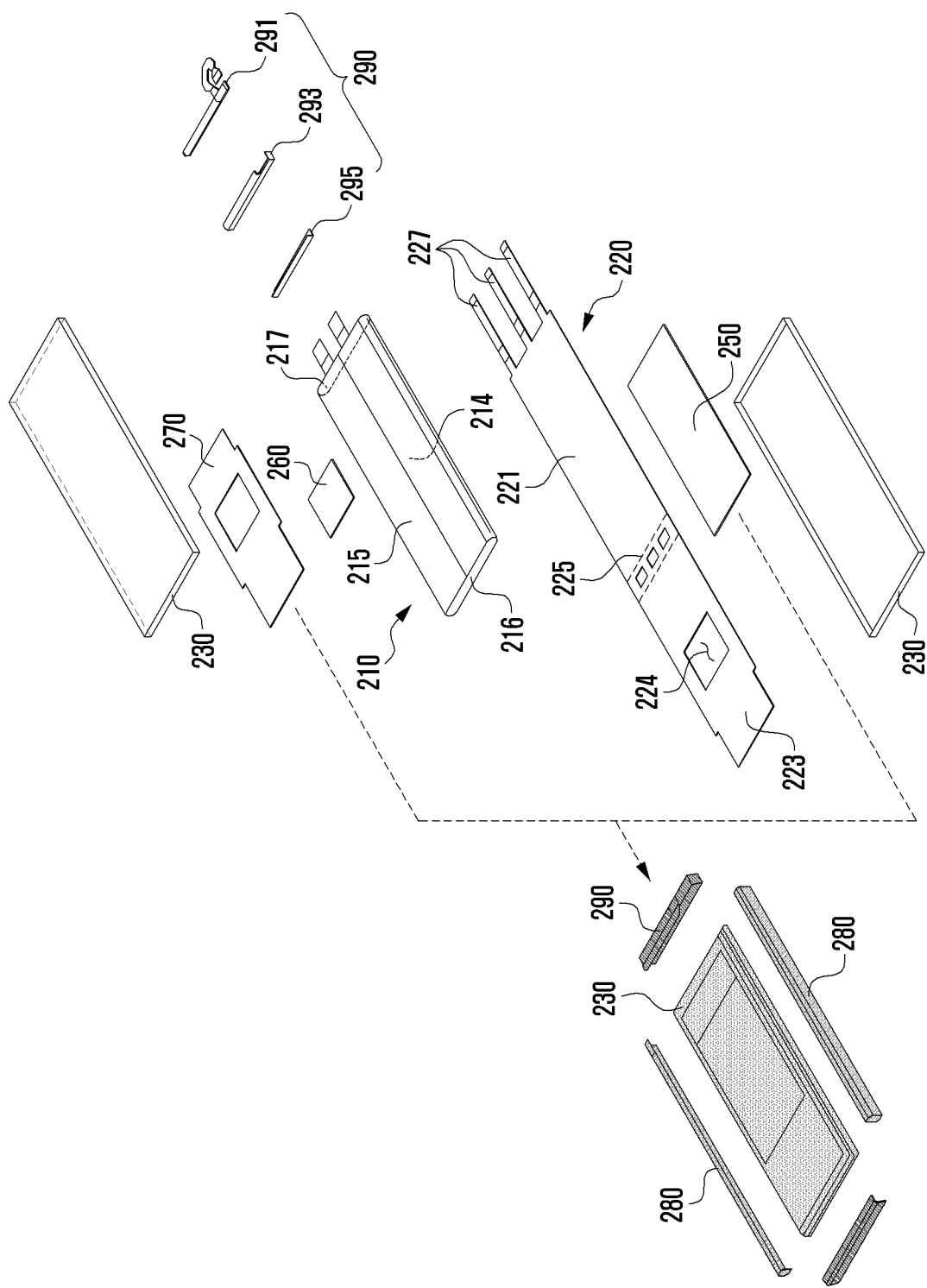
FIG. 2 is an exploded perspective view showing the entire configuration of a battery of an electronic device according to certain embodiments of the present disclosure.

FIG. 2 is an exploded perspective view showing the entire configuration of a battery 200 of an electronic device according to certain embodiments of the present disclosure.

As shown in FIG. 2, the battery 200 of the electronic device may include a protective member 280, a battery circuit assembly 290, a jelly-roll structure 210, and a pouch 230.

The protective member 280 is disposed on the outer surface of the battery and protects the battery from an external impact. The protective member 280 may be attached to the outer surface of the battery in the form of a tape or combined through a press fit technique. The protective member 280 may be disposed on one of the outer surfaces of the battery or on some surfaces.

The battery circuit assembly 290 may include a battery circuit 291, a mold 293, and a substrate adhesive 295. The battery circuit 291 performs a function of outputting electricity generated from the jelly-roll structure 210. In addition, the battery circuit 291 may include a battery protection circuit to prevent degradation or burnout of the battery. The mold 293 encompasses and protects the battery circuit 291. The substrate adhesive 295 couples and/or connects the battery circuit 291 to the pouch 230 that surrounds the jelly-roll structure 210.

In describing the battery of the electronic device in this disclosure, a "first" direction indicates a downward direction, and a "second" direction indicates an upward direction, relative to the depiction of FIG. 2. Also, a "third" direction indicates one lateral direction perpendicular to both the first and second directions, and a "fourth" direction indicates a direction opposite to the third direction.

However, the above directions are examples for convenience. When any one of the first to fourth directions is changed, the remaining directions will be changed correspondingly.

Figure 3:
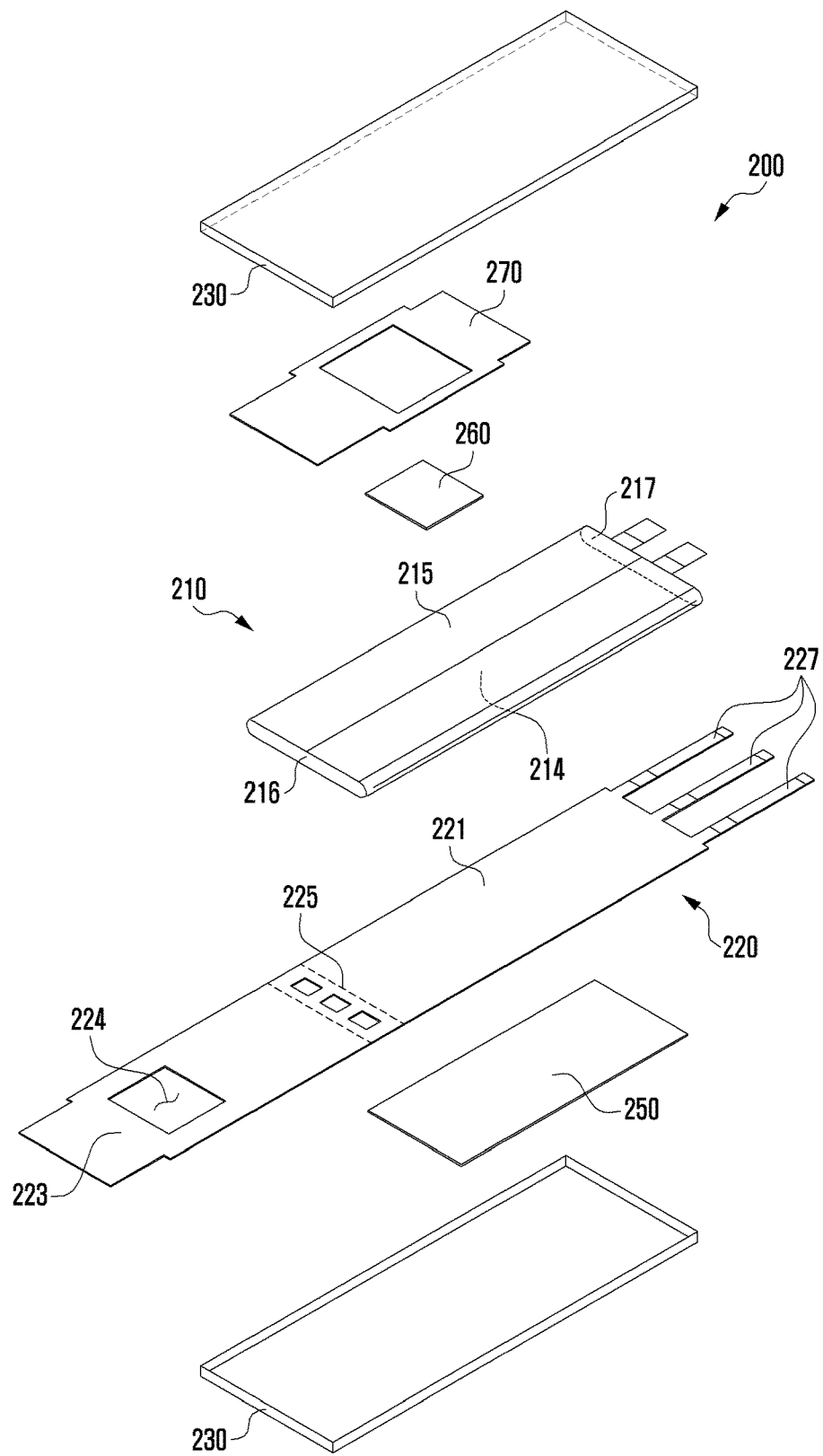
FIG. 3 is an exploded perspective view showing a battery of an electronic device according to an embodiment of the present disclosure.

FIG. 3 is an exploded perspective view showing a battery 200 of an electronic device according to an embodiment of the present disclosure.

As also shown in FIG. 3, the battery 200 may include the jelly-roll structure 210, an outer cover layer 220, and the pouch 230.

Figure 4:
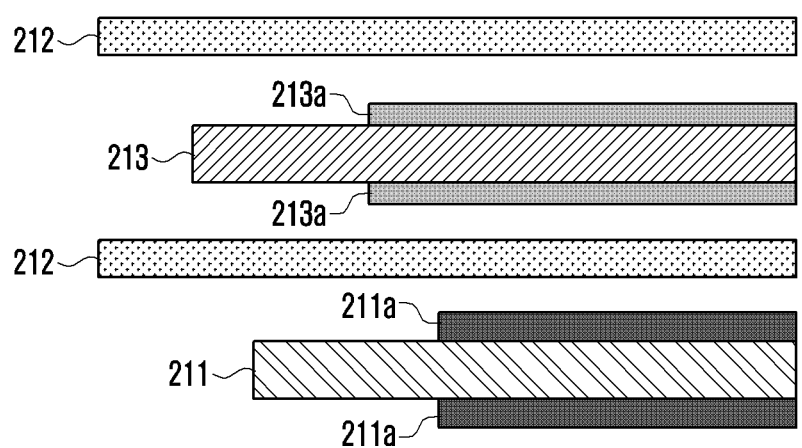
FIG. 4 is a cross-sectional view showing a cathode, an anode, and a separator which includes a jelly-roll structure of a battery of an electronic device according to an embodiment of the present disclosure.

The jelly-roll structure 210 may include a rolled form of a thin stack of a cathode (211 in FIG. 4, also referred to as a positive electrode), a separator (212 in FIG. 4), and an anode (213 in FIG. 4, also referred to as a negative electrode).

The jelly-roll structure 210 may include a hexahedral shape having four flat surfaces and two curved surfaces. Four flat surfaces may be defined as a first surface 214, a second surface 215, a third surface 216, and a fourth surface 217, respectively.

The first surface 214 faces the first direction and includes the lower surface of the jelly-roll structure 210 in FIG. 3. The second surface 215 faces the second direction, being opposite to the first surface 214, and may include the upper surface of the jelly-roll structure 210 in FIG. 3.

The third surface 216 faces the third direction and may include one (visible in FIG. 3) of both shorter lateral surfaces of the jelly-roll structure 210. The fourth surface 217 faces the fourth direction, opposite to the third surface 216, and may include the other shorter lateral surface (invisible in FIG. 3).

The outer cover layer 220 may be formed of a polymeric material. The outer cover layer 220 may include an adhesive layer, implemented using materials such as an adhesive tape. In another embodiment, the outer cover layer 220 may be referred to as a first polymeric layer 220.

The outer cover layer 220 may be formed at least partially or completely enclosing the first surface 214, the second surface 215, the third surface 216, and the fourth surface 217 of the jelly-roll structure 210. Four portions of the outer cover layer 220 corresponding to the first to fourth surfaces 214 to 217 of the jelly-roll structure 210 are defined as a first portion 221, a second portion 223, a third portion 225, and a fourth portion 227, respectively.

The first portion 221 corresponds to and is attached to the first surface 214 of the jelly-roll structure 210. The second portion 223 corresponds to and is attached to the second surface 215 of the jelly-roll structure 210. The second portion 223 has an opening 224 in part, so that the second surface 215 of the jelly-roll structure 210 is exposed partially through the opening 224 of the second portion 223.

The third portion 225 corresponds to the third surface 216 of the jelly-roll structure 210 and is formed integrally with both the first portion 221 and the second portion 223. The third portion 225 is attached to the third surface 216 of the jelly-roll structure 210 while exposing partially the third surface 216 but not exposing edges of the third surface 216.

The fourth portion 227 corresponds to the fourth surface 217 of the jelly-roll structure 210 and will connect the first portion 221 and the second portion 223. Unlike the third portion 225, the fourth portion 227 is formed integrally with one of the first and second portions 221 and 223 and attached to the other in order to connect the first and second portions 221 and 223.

The pouch 230 encloses and seals both the jelly-roll structure 210 and the outer cover layer 220. The pouch 230 may contain an electrolytic solution therein such that the jelly-roll structure 210 can operate as a battery through a chemical reaction.

In an embodiment, the battery 200 may include a first adhesive layer 250, a second adhesive layer 260, and a third adhesive layer 270.

The first adhesive layer 250 may be formed of a polymeric material. In another embodiment, the first adhesive layer 250 may be referred to as a second polymeric layer 250.

The first adhesive layer 250 may be disposed between the first portion 221 of the outer cover layer 220 and the pouch 230 and provide adhesion therebetween.

The second adhesive layer 260 may be formed of a polymeric material. In another embodiment, the second adhesive layer 260 may be referred to as a third polymeric layer 260. The second adhesive layer 260 may be disposed in the opening 224 of the second portion 223 of the outer cover layer 220 to provide adhesion between the second surface 215 of the jelly-roll structure 210 and the pouch 230.

The third adhesive layer 270 may be formed of a polymeric material. In another embodiment, the third adhesive layer 270 may be referred to as a fourth polymeric layer 270. The third adhesive layer 270 may be interposed between the second portion 223 of the outer cover layer 220 and the pouch 230 and provide adhesion therebetween.

FIG. 4 is a cross-sectional view showing a cathode 211, an anode 213, and a separator 212 which include a jelly-roll structure 210 of a battery of an electronic device according to an embodiment of the present disclosure.

Each of the cathode 211 and the anode 213 may be implemented using a basic material and an active material 211a or 213a applied thereto, thus forming an electrode. Depending on the type of the applied active material 211a or 213a, the type of the battery (e.g., a lithium ion battery, a nickel hydride battery, a nickel cadmium battery, etc.) and the polarity (e.g., positive or negative) of the electrode may be determined.

The separator 212 is disposed between the cathode 211 and the anode 213, and prevents short circuits caused by direct contact of the cathode 211 and anode 213. In order to prevent direct contact between the cathode and anode 211 and 213, when both electrodes 211 and 213 and the separator 212 are rolled together, the separator 212 may be further disposed towards the cathode 211 or the anode 213 in a rolled direction.

As shown in FIG. 4, the length of the cathode 211 may be smaller than the length of the anode 213. Also, the length of the anode 213 may be smaller than the length of the separator 212. Such a difference in length may help prevent contact between the cathode 211 and the anode 213.

FIGS. 5A to 5D are a front view, a rear view, a plan view, and a bottom view showing a battery 200 of an electronic device according to an embodiment of the present disclosure.

Figure 5A:
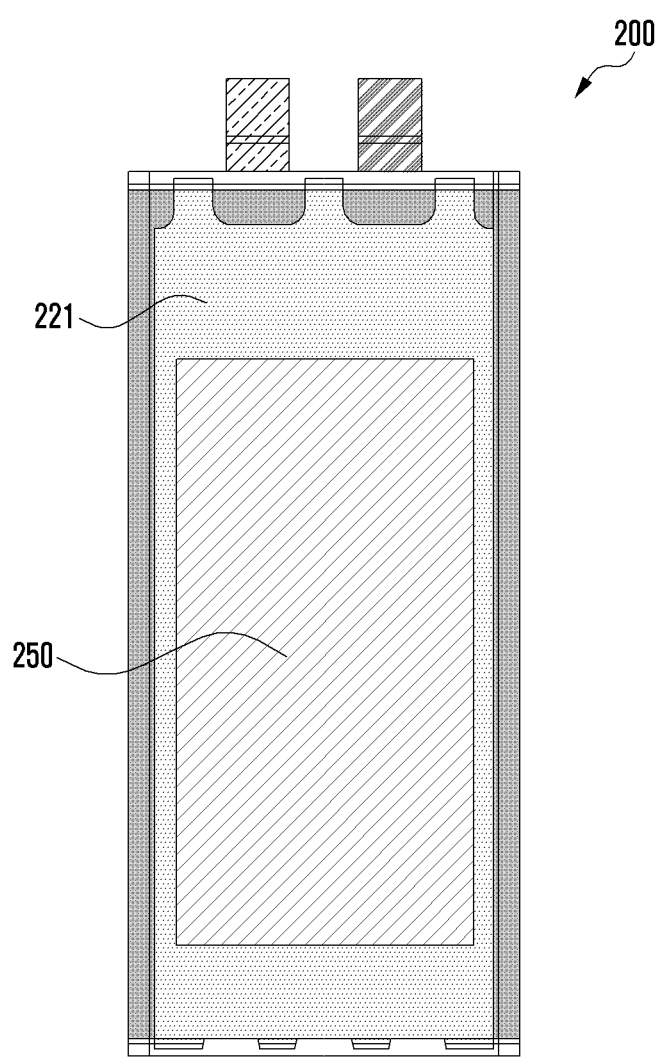
FIG. 5A is a front view showing a battery of and electronic device.

FIG. 5A is a front view that shows the battery 200, especially, the first surface (214 in FIG. 3) of the jelly-roll structure, the first portion 221 of the outer cover layer, and the first adhesive layer 250.

As described above, the jelly-roll structure (210 in FIG. 3) is formed by rolling a stack of the cathode (211 in FIG. 4), the anode (213 in FIG. 4), and the separator (212 in FIG. 4) all of which take the form of a thin film, and sealing the rolled stack within the pouch. When an external impact is applied, the jelly-roll structure may move within the pouch. If the jelly-roll structure moves too severely, the edges of the jelly-roll structure may be damaged. Specifically, when the edges of the jelly-roll structure are impacted, the separator (212 in FIG. 4) (which is formed longer than the cathode 211 in FIG. 4 and the anode 213 in FIG. 4) may curl and allow unwanted contact between the cathode and anode. Therefore, in order to reduce the potential for movement within the pouch, the jelly-roll structure may in the present disclosure be directly attached to the pouch, so that the edges of the jelly-roll structure can be protected from damage. However, in this case, if the external impact is concentrated on the boundary of a directly-attached part of the jelly-roll structure, this may result in damage to the surface (e.g., the cathode) of the jelly-roll structure.

Accordingly, by forming the outer cover layer (220 in FIG. 4) as to enclose the first to fourth surfaces (214 to 217 in FIG. 3) of the jelly-roll structure, and attaching the outer cover layer and the pouch through the first adhesive layer 250, it is possible to improve protection of the surface of the jelly-roll structure from damage.

Figure 5B:
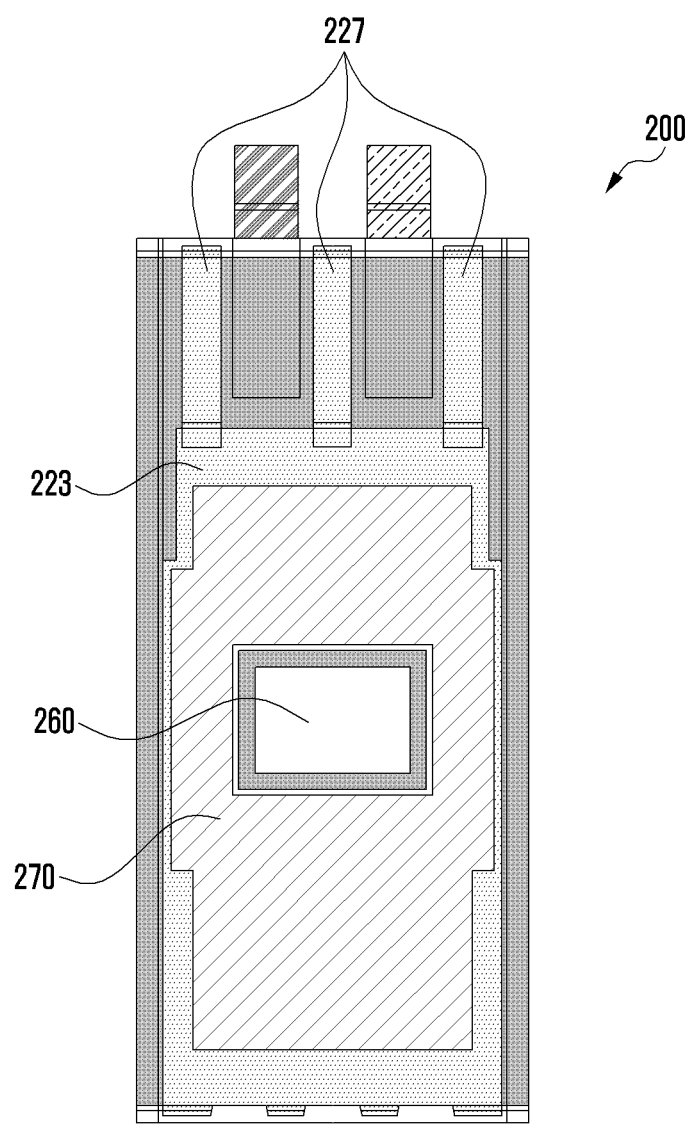
FIG. 5B is a rear view showing a battery of and electronic device.

FIG. 5B is a rear view that shows the battery 200, especially, the second surface (215 in FIG. 3) of the jelly-roll structure, the second portion 223 of the outer cover layer, the second adhesive layer 260, and the third adhesive layer 270.

As described above, the jelly-roll structure (210 in FIG. 3) is formed by rolling a stack of the cathode (211 in FIG. 4), the anode (213 in FIG. 4), and the separator (212 in FIG. 4) all of which are formed as a thin film, and then sealing the rolled stack within the pouch. For post-processing, such as attaching the outer cover layer to the jelly-roll structure or sealing the jelly-roll structure with the pouch, the jelly-roll structure may be kept in a rolled state during the process. The second adhesive layer 260 may be used to maintain the rolled state of the jelly-roll structure.

As described above, the opening 224 (from FIG. 3) may be formed in the second portion 223 of the outer cover layer. When the second portion 223 of the outer cover layer is attached to the second surface (215 in FIG. 3) of the jelly-roll structure, interference with the second adhesive layer 260 may be reduced through the opening 224.

In addition, as shown in FIG. 5B, the fourth portion 227 of the outer cover layer may be integrally formed with the first portion (221 in FIG. 5A) and attached to the second portion 223. This is, however, an example. Alternatively, the fourth portion 227 may be integrally formed with the second portion 223 and attached to the first portion (221 in FIG. 5A).

Figure 5C:
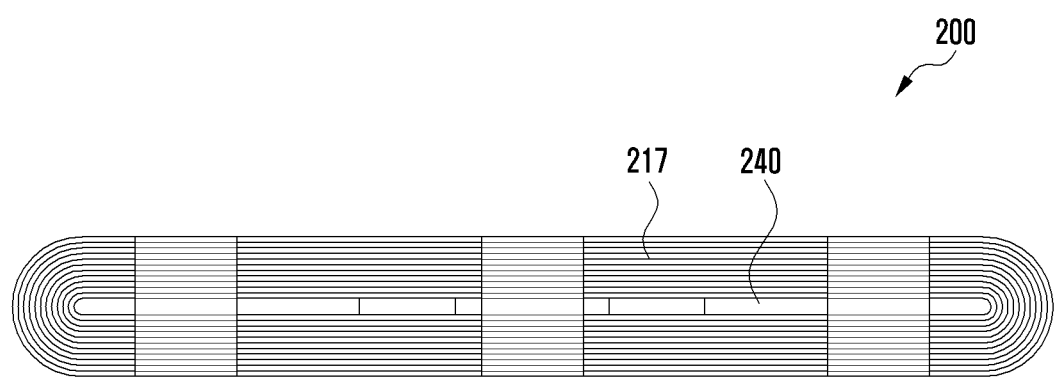
FIG. 5C is a plan view showing a battery of and electronic device.

FIG. 5C is a plan view that shows the battery 200, especially, the fourth surface 217 which is one of the rolled surfaces of the jelly-roll structure (210 in FIG. 3).

As shown in FIG. 5C, the jelly-roll structure according to an embodiment of the present disclosure may be formed like a flat rectangular parallelepiped shape which results from being wound around a virtual rectangular plane 240 as an axis. That is, because the cathode (211 in FIG. 4), the separator (212 in FIG. 4), and the anode (213 in FIG. 4) are not completely folded when wound, a thin space which is seen like the rectangular plane 240 may occur as the axis.

In addition, because portions of the cathode, the anode, and the separator where the winding is started cause a step due to their thickness themselves, such a thin space may not necessarily be formed as the rectangular plane 240.

Figure 5D:
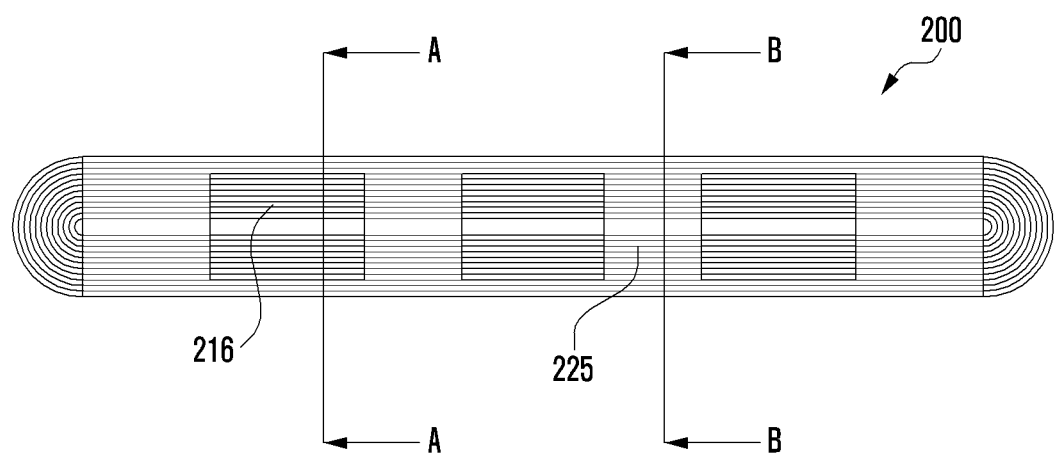
FIG. 5D is a bottom view showing a battery of an electronic device according to an embodiment of the present disclosure.

FIG. 5D is a bottom view that shows the battery 200, especially, the third surface 216 which is one of the rolled surfaces of the jelly-roll structure (210 in FIG. 3).

When an external impact is applied to the battery, the jelly-roll structure (210 in FIG. 3) placed inside the pouch may move. If the jelly-roll structure moves severely, a phenomenon that the cathode (211 in FIG. 4), the anode (213 in FIG. 4), or the separator (212 in FIG. 4) breaks away near the axis of winding of the jelly-roll structure may arise. In addition, the jelly-roll structure may be damaged at edges thereof while moving, so that the cathode and the anode may get in contact with each other.

In an embodiment, the third portion 225 of the outer cover layer may directly connect the first portion (221 in FIG. 5A) and the second portion (223 in FIG. 5B), and also be attached to the third surface 216 of the jelly-roll structure while exposing a part of the third surface 216 but not exposing edges of the third surface 216.

Because of supporting the third surface 216 of the jelly-roll structure around the winding axis of the jelly-roll structure, the third portion 225 can prevent a phenomenon that the cathode (211 in FIG. 4), the anode (213 in FIG. 4), or the separator (212 in FIG. 4) breaks away due to an external impact.

In addition, because the third portion 225 is attached to the third surface 216 without exposing edges of the third surface 216, the third portion 225 can protect the edges of the jelly-roll structure and also prevent the separator (212 in FIG. 4) from being curled or torn. Therefore, it is possible to prevent undesirable contact between the cathode (211 in FIG. 4) and the anode (213 in FIG. 4).

In addition, the third portion 225 may be attached to the third surface 216 of the jelly-roll structure such that a part of the third surface 216 is exposed. Therefore, even though the jelly-roll structure is sealed within the pouch, a path that allows the electrolyte to be impregnated into the jelly-roll structure may be provided.

For example, at least one square hole may be formed in the third portion 225 to provide a path through which the electrolyte can be impregnated into the jelly-roll structure. The width of the square hole may be smaller than the width of the third surface 216, i.e., than the thickness of the jelly-roll structure. This allows the edges of the third surface 216 to be protected by the third portion 225 without exposure.

The square hole formed in the third portion 225 to act as a path for impregnation of the electrolyte is an example and not to be construed as a limitation. Alternatively, any other shape such as a circle, a hexagon, or an ellipse may be applied to such a hole.

Figure 6A:
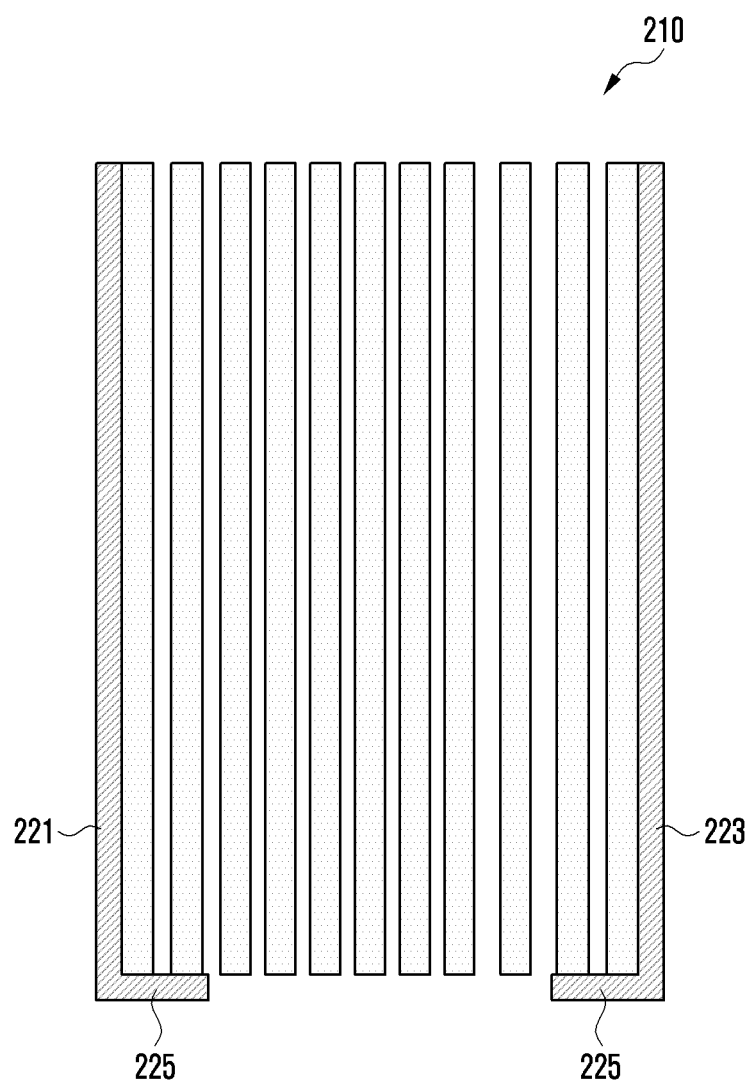
FIG. 6A is a cross-sectional view taken along line A-A of FIG. 5D.
Figure 6B:
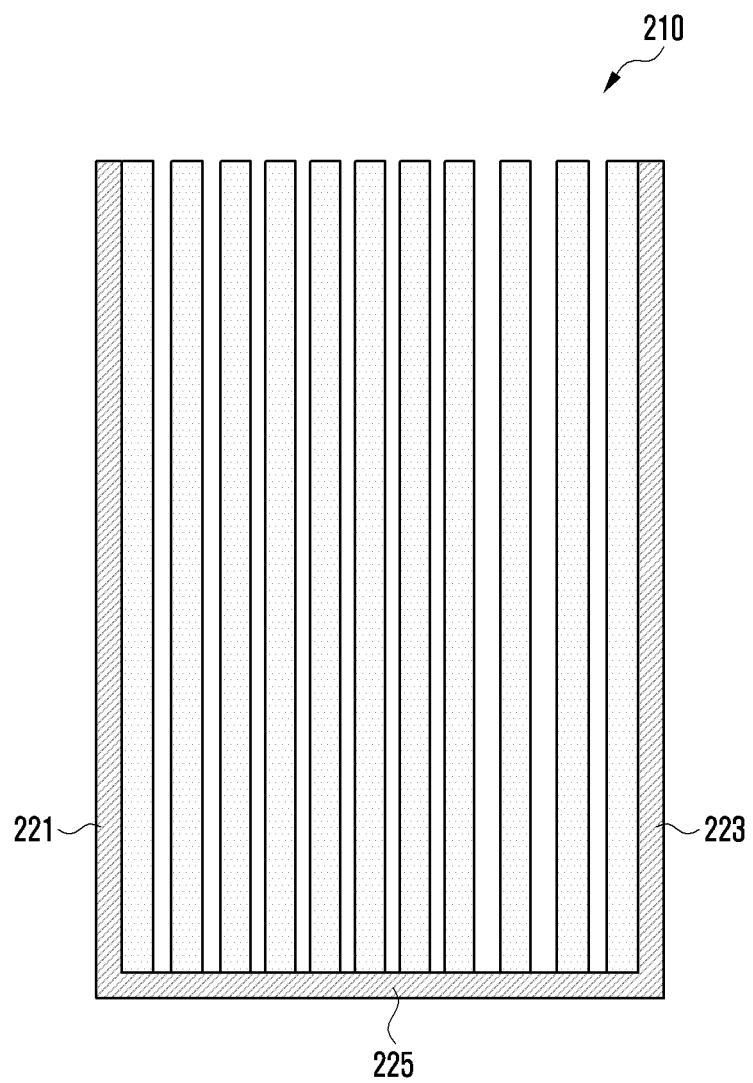
FIG. 6B is a cross-sectional view taken along line B-B of FIG. 5D.

FIG. 6A is a cross-sectional view taken along line A-A of FIG. 5D, and FIG. 6B is a cross-sectional view taken along line B-B of FIG. 5D.

As shown in FIG. 6A, the third portion 225 is attached to the third surface (216 in FIG. 5D) while exposing at least a part of the third surface, thereby providing a path through which the electrolyte can be impregnated into the jelly-roll structure 210. Further, the third portion 225 surrounds the edges of the third surface (216 in FIG. 5D), and may further be attached to the same edges, thereby protecting the edges of the jelly-roll structure 210.

As shown in FIG. 6B, the left and right outermost parts (i.e., the first and second surfaces 214 and 215 in FIG. 3) of the jelly-roll structure 210 are respectively attached to the first and second portions 221 and 223 of the outer cover layer, and the first and second portions 221 and 223 are attached to the pouch. Unlike the left and right outermost parts, the central part of the jelly-roll structure 210 is not directly fixed. Therefore, when an external impact is applied, the cathode (211 in FIG. 4), the anode (213 in FIG. 4), or the separator (212 in FIG. 4) may break away.

However, as shown in FIGS. 5D and 6B, the third portion 225 traverses the third surface 216 and is directly connected to the first and second portions 221 and 223, thereby supporting the third surface 216. Therefore, it is possible to prevent break away of the cathode (211 in FIG. 4), the anode (213 in FIG. 4), and/or the separator (212 in FIG. 4) from the central part of the jelly-roll structure 210.

Figure 7:
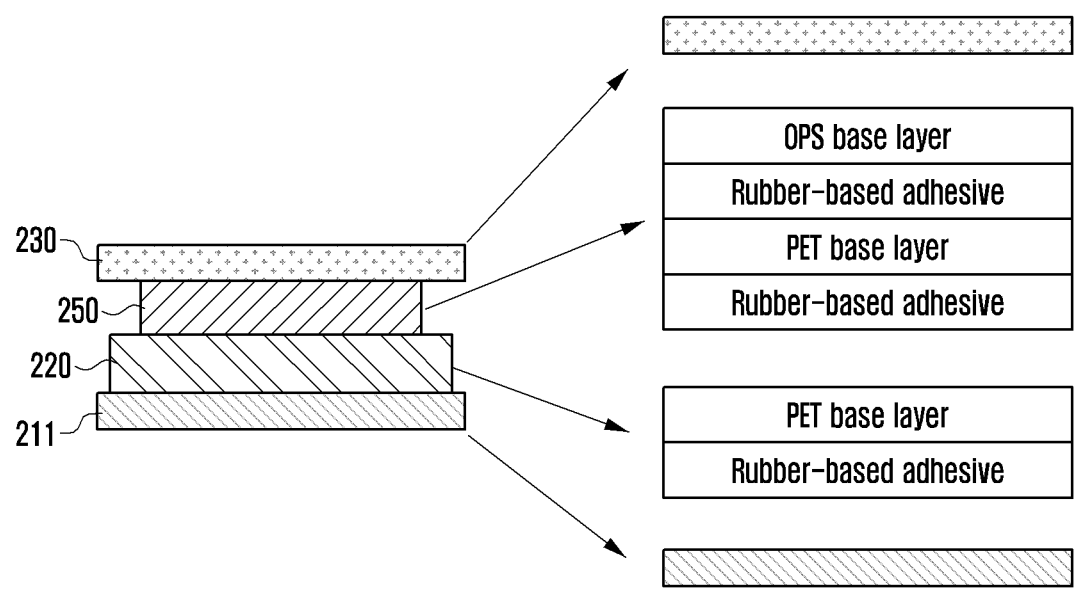
FIG. 7 is a cross-sectional view showing a partial stack of a pouch and a jelly-roll structure in a battery of an electronic device according to an embodiment of the present disclosure.

FIG. 7 is a cross-sectional view showing a partial stack of a pouch 230 and a jelly-roll structure 210 (in FIG. 3) in a battery of an electronic device according to an embodiment of the present disclosure.

For simplification, FIG. 7 shows the cathode 211 among components of the jelly-roll structure. In addition, FIG. 7 shows an example where the cathode 211 is disposed on the outermost side of the jelly-roll structure after wound. Alternatively, the anode may be disposed on the outermost side after wound.

The outer cover layer 220 may be implemented using a base layer (i.e., a basic framework) and an adhesive layer. The base layer may be formed using various kinds of polymeric materials such as, for example, polyethylene terephthalate (PET). The adhesive layer may be formed using various kinds of adhesive materials such as, for example, rubber-based adhesive.

The outer cover layer 220 is attached to the jelly-roll structure (210 in FIG. 3) by the adhesive layer thereof and protects the jelly-roll structure by the base layer thereof.

The first adhesive layer 250 may be implemented by a PET base layer and an oriented polystyrene (OPS) base layer. Although not shown, the above-discussed second and third adhesive layers (260 and 270 in FIG. 3) may be implemented similarly. The OPS base layer may lack an adhesive property until a certain external stimulus is applied. When the jelly-roll structure is sealed in the pouch 230 and exposed to the electrolyte, the adhesive property is revealed, such that the pouch 230 and the outer cover layer 220 mutually adhere to each other.

If any part having the adhesive property is exposed during a manufacturing process of the battery, prior to the pouch 230 being sealed to the jelly-roll structure (210 in FIG. 3) and the outer cover layer 220, foreign matter may adhere to the exposed part and introduced into the battery. Therefore, by using certain materials, such as the OPS base layer which produce adhesive properties in response to a certain and limited external stimuli (that is, by controlling the adhesive property to activate after sealing in the pouch 230 and exposure to the electrolyte), it is possible to prevent the inflow of foreign matter.

Figure 8:
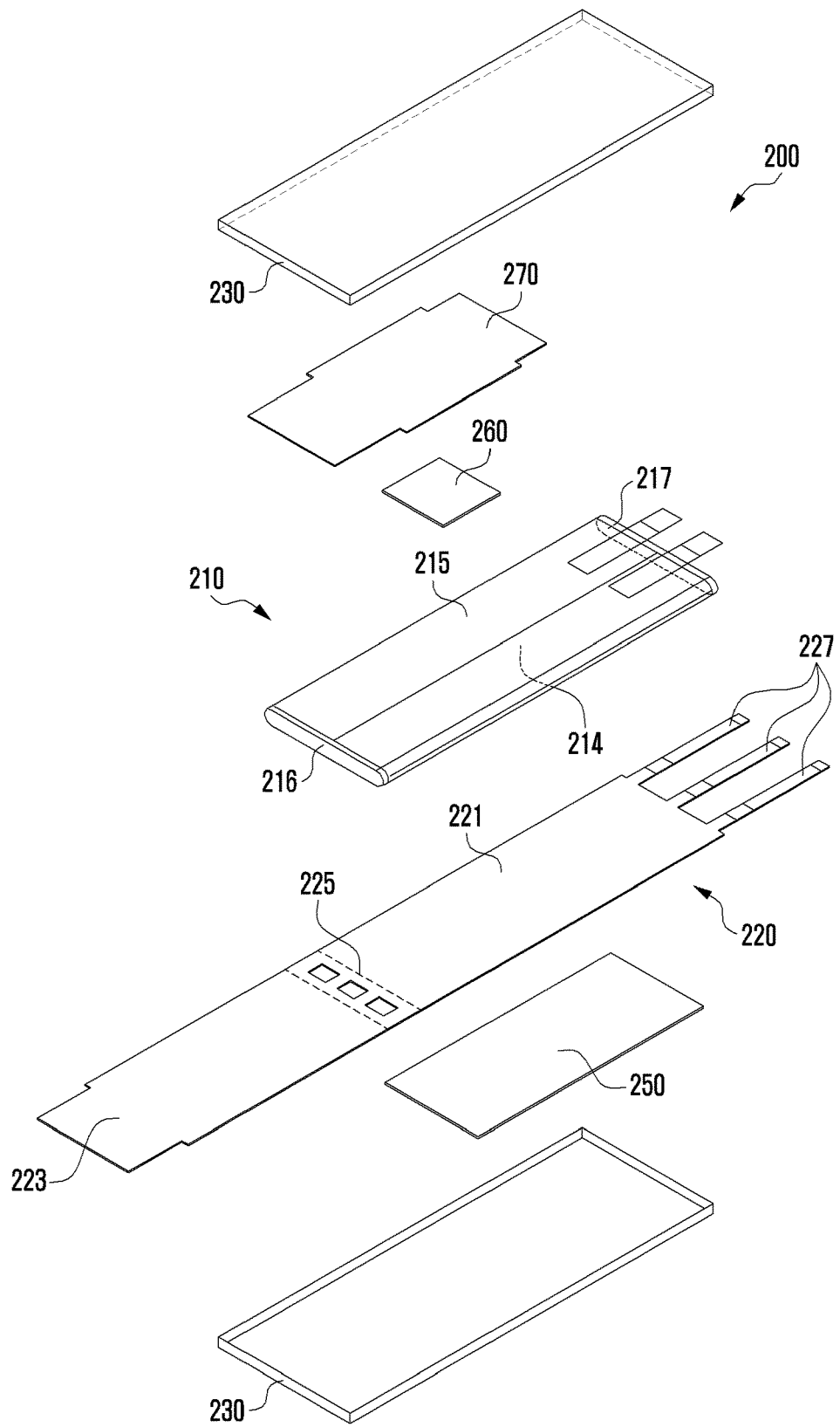
FIG. 8 is an exploded perspective view showing a battery of an electronic device according to another embodiment of the present disclosure.

FIG. 8 is an exploded perspective view showing a battery of an electronic device according to another embodiment of the present disclosure.

The embodiment of FIG. 8 is similar to the above-described embodiment of FIGS. 3 to 7. However, in this embodiment, no opening (224 in FIG. 3) is provided in the second portion 223 of the outer cover layer 220. In addition, the third adhesive layer 270 does not include an opening.

The fact that there is no opening formed in the outer cover layer 220 and the third adhesive layer 270 may allow the outer cover layer 220 and the third adhesive layer 270 to be more easily manufactured.

Figure 9:
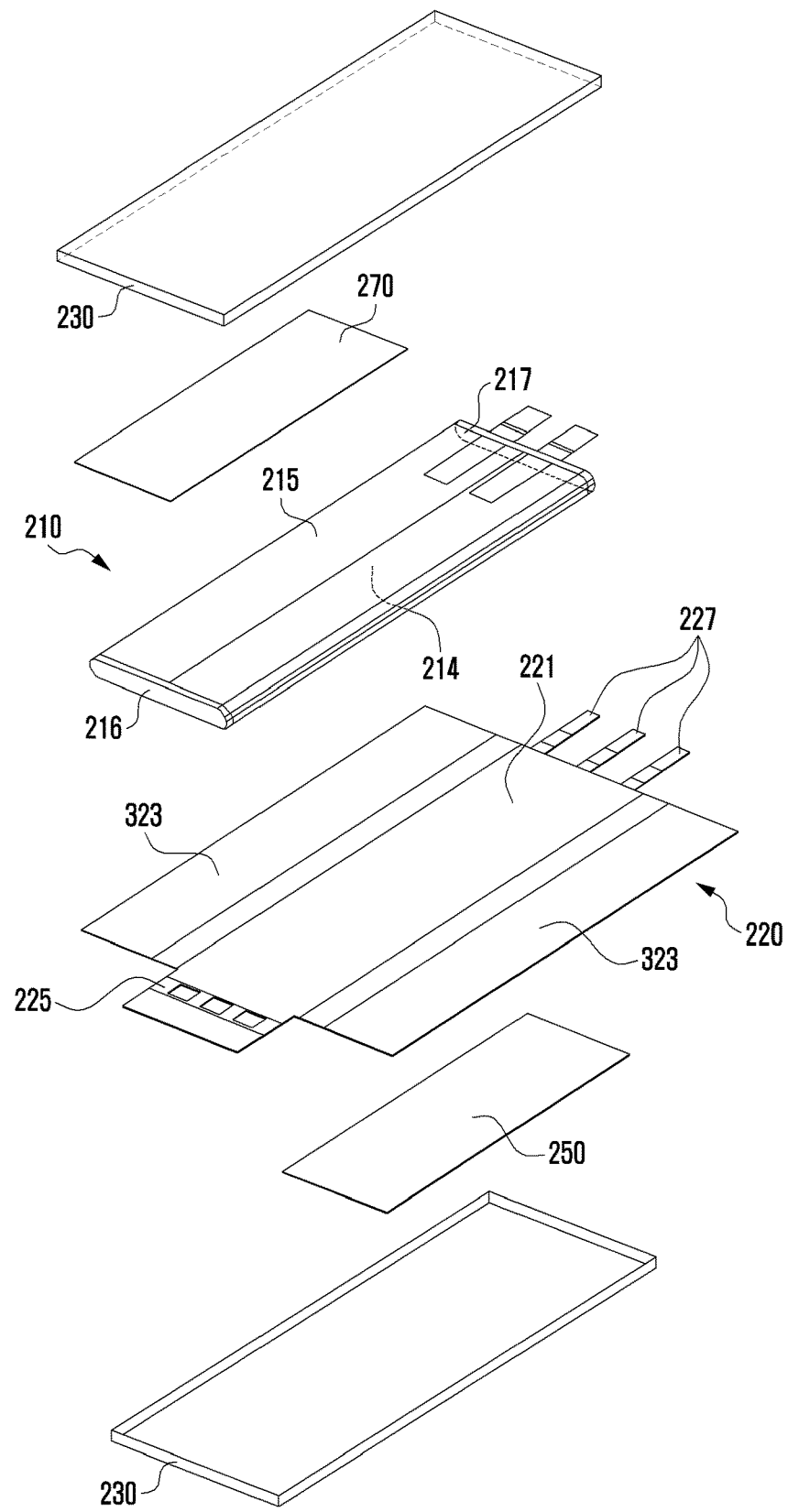
FIG. 9 is an exploded perspective view showing a battery of an electronic device according to still another embodiment of the present disclosure.

FIG. 9 is an exploded perspective view showing a battery of an electronic device according to still another embodiment of the present disclosure.

The embodiment of FIG. 9 is similar to the above-described embodiment of FIGS. 3 to 7 except for a differing shape of the outer cover layer 220.

The outer cover layer 220 may be formed to enclose the first surface 214 to the fourth surface 217 of the jelly-roll structure 210, and also enclose the rest of the jelly-roll structure 210. The first portion 221, the third portion 225 and the fourth portion 227, which correspond to the first surface 214, the third surface 216 and the fourth surface 217 of the jelly-roll structure 210, respectively, may be similar to those of the above-described embodiment in FIGS. 3 to 7. However, the second portion 323 surrounding the second surface 215 may be formed in a shape different from that of the above-described embodiment.

The second portion 323 corresponds to the second surface 215 of the jelly-roll structure 210 and is extended from both edges of the first portion 221 not connected to the third and fourth portions 225 and 227. That is, as seen from FIG. 9, the second portion 323 may be divided into two parts and formed from left and right sides of the first portion 221. The second portion 323 may cover and be bonded to the second surface 215 of the jelly-roll structure 210 while covering left and right lateral surfaces of the jelly-roll structure 210.

Therefore, in this embodiment, the outer cover layer 220 including the modified second portion 323 encloses all the surfaces of the jelly-roll structure 210, thus further reducing the effect of an external impact applied to the jelly-roll structure 210.

FIGS. 10A to 10F are views illustrating a process of assembling a battery according to an embodiment of the present disclosure.

Figure 10A:
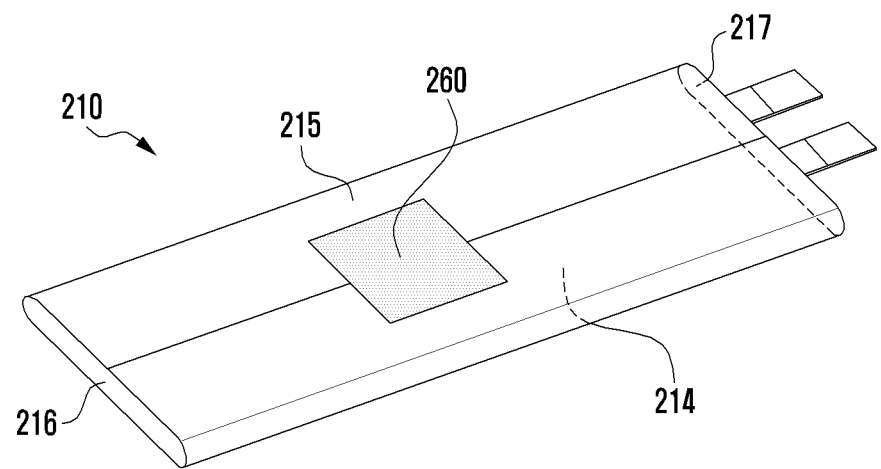
FIG. 10A, FIG. 10B, FIG. 10C, FIG. 10D, FIG. 10E, and FIG. 10F are views illustrating a process of assembling a battery according to an embodiment of the present disclosure.

As shown in FIG. 10A, the jelly-roll structure 210 formed by winding the cathode, the anode, and the separator together is fixed with the second adhesive layer 260 to prevent the jelly-roll structure 210 from being unwound. Although in FIG. 10A the wound end of the jelly-roll structure is disposed on the second surface 215, this is an example. Alternatively, the wound end may be disposed on any other surface of the jelly-roll structure.

Figure 10B:
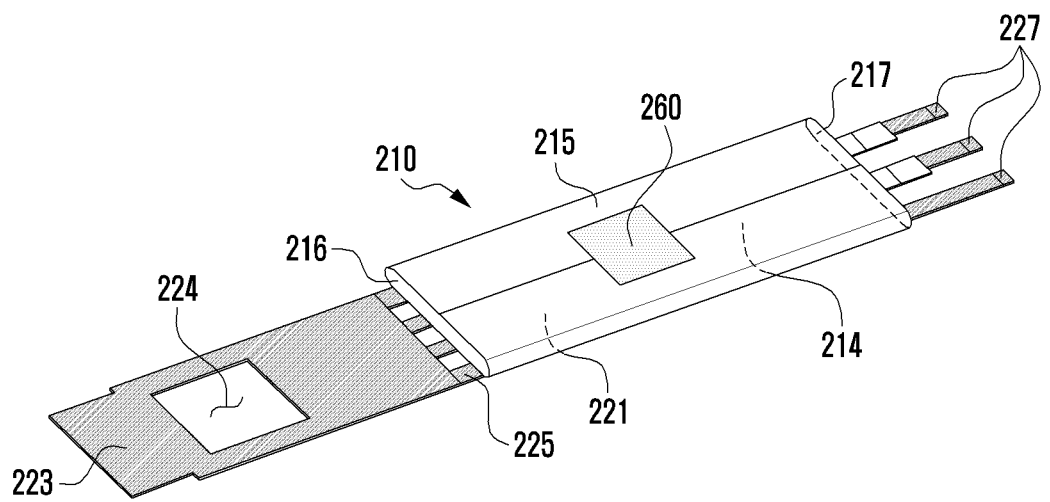

Next, as shown in FIG. 10B, the outer cover layer (220 in FIG. 3) including the first portion 221, the second portion 223, the third portion 225, and the fourth portion 227 is prepared for enclosing and protecting the first surface 214, the second surface 215, the third surface 216, and the fourth surface 217 of the jelly-roll structure 210. Then, the jelly-roll structure 210 is placed on the outer cover layer 220 such that the first surface 214 of the jelly-roll structure meets the first portion 221 of the outer cover layer.

Figure 10C:
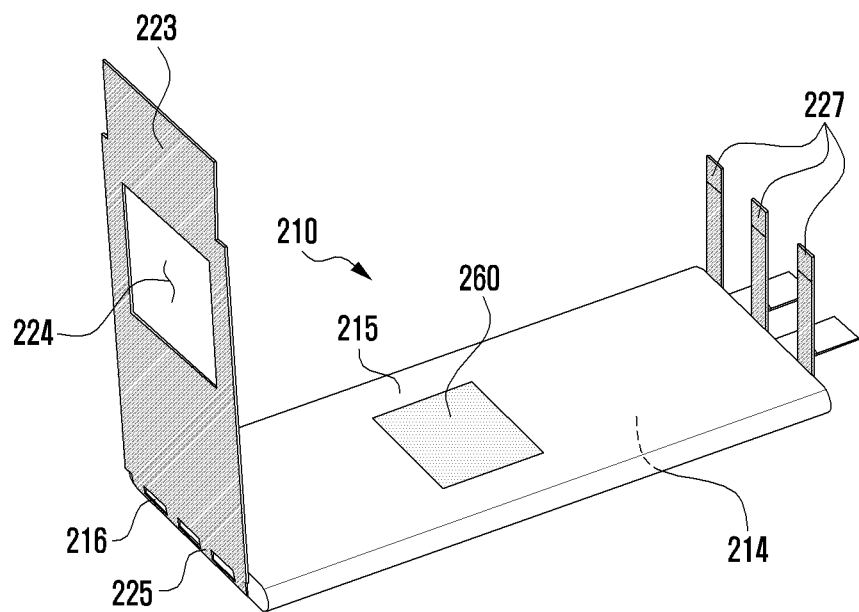

Next, as shown in FIG. 10C, the outer cover layer is bent upward at both sides such that the third and fourth surfaces 216 and 217 of the jelly-roll structure meet the third and fourth portions 225 and 227 of the outer cover layer, respectively.

Figure 10D:
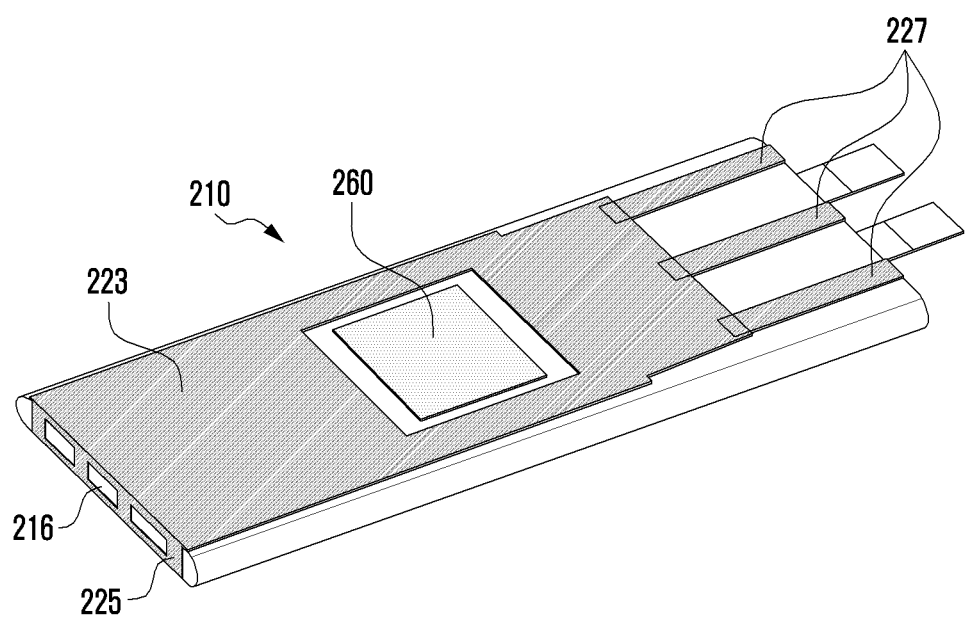

Next, as shown in FIG. 10D, the outer cover layer is further bent inward at both sides, and then the second and fourth portions 223 and 227 are combined with each other on the second surface 215 of the jelly-roll structure.

Figure 10E:
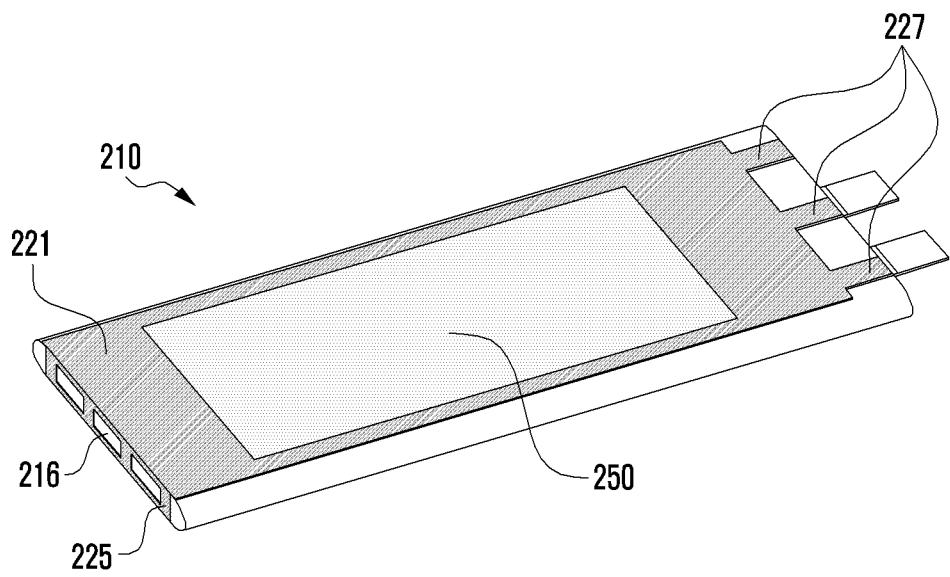

Next, as shown in FIG. 10E, the first adhesive layer 250 is bonded to the first portion 221 of the outer cover layer. For reference, in FIG. 10E, the jelly-roll structure enclosed by the outer cover layer is depicted as being inverted. When sealed with the pouch and then exposed to the electrolyte, the first adhesive layer 250 can be bonded to the pouch via an adhesive property thereof activated.

Figure 10F:
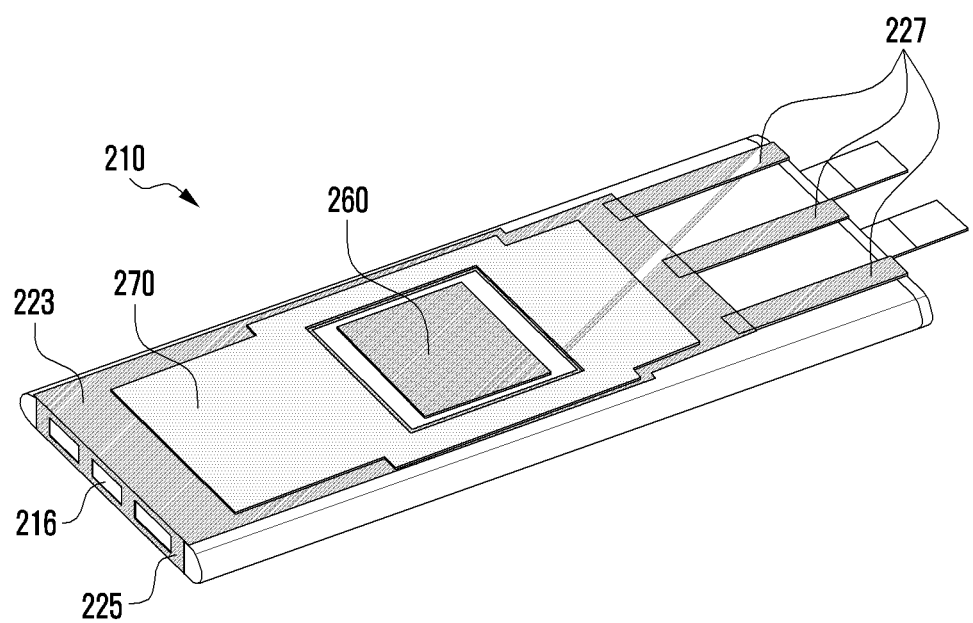

Finally, as shown in FIG. 10F, the third adhesive layer 270 may be bonded to the second portion 223 of the outer cover layer. Like the first adhesive layer 250, each of the second and third adhesive layers 260 and 270 may be bonded to the pouch via an adhesive property thereof activated when exposed to the electrolyte.

According to an embodiment, an electronic device may include a battery that includes a jelly-roll structure including a cathode, a separator, and an anode which are wound around a rectangular plane; a first polymeric layer; and a pouch sealing the jelly-roll structure and the first polymeric layer. The jelly-roll structure may include a first surface facing a first direction and being parallel with the rectangular plane; a second surface facing a second direction opposite to the first direction; a third surface connecting the first surface and the second surface and facing a third direction perpendicular to the rectangular plane, the first direction, and the second direction; and a fourth surface connecting the first surface and the second surface and facing a fourth direction opposite to the third direction. The first polymeric layer may include a first portion attached to a substantially entire area of the first surface; a second portion having an opening and attached to the second surface; a third portion attached to a part of the third surface and connecting the first portion and the second portion; and a fourth portion attached to a part of the fourth surface and connecting the first portion and the second portion.

The battery may further include a second polymeric layer disposed between the first portion of the first polymeric layer and the pouch, attached to the first portion and the pouch, and formed of a different material from the first polymeric layer.

The battery may further include a third polymeric layer disposed between the second surface of the jelly-roll structure and the pouch, attached to the second surface and the pouch through the opening, and formed of a same material as the second polymeric layer.

The battery may further include a fourth polymeric layer disposed between the second portion of the first polymeric layer and the pouch, attached to the second portion and the pouch, and formed of a same material as the third polymeric layer.

Each of the second, third, and fourth polymeric layers may include oriented polystyrene (OPS).

The first polymeric layer may be formed of polyethylene terephthalate (PET).

The first polymeric layer may be attached to at least one of the first, second, third, and fourth surfaces through a rubber-based adhesive.

According to an embodiment, a battery may include a jelly-roll structure having a rolled form of a stack of a cathode, a separator, and an anode; an outer cover layer enclosing surfaces of the jelly-roll structure; and a pouch sealing the jelly-roll structure and the outer cover layer. The jelly-roll structure may include a first surface; a second surface disposed in a direction opposite to the first surface; a third surface corresponding to one side of the rolled stack of the jelly-roll structure and connecting the first surface and the second surface; and a fourth surface corresponding to other side of the rolled stack of the jelly-roll structure, connecting the first surface and the second surface, and disposed in a direction opposite to the third surface. The outer cover layer may include a first portion bonded to the first surface; a second portion bonded to the second surface; a third portion bonded to a part of the third surface and connected to the first and second portions; and a fourth portion bonded to a part of the fourth surface.

The jelly-roll structure may be formed by winding a stack of a cathode, a separator and an anode around a virtual rectangular plane as an axis.

The second portion of the outer cover layer may have an opening formed to expose a part of the second surface of the jelly-roll structure.

The third portion of the outer cover layer may be bonded to the third surface while exposing a part of the third surface without exposing an edge of the third surface connected to the first or second surface.

The third portion of the outer cover layer may have a hole through which a part of the third surface is exposed, and the hole may be formed to be smaller than a thickness of the jelly-roll structure so that the third portion of the outer cover layer covers an edge between the third and first surfaces or an edge between the third and second surfaces.

The fourth portion of the outer cover layer may be formed at one end thereof integrally with one of the first and second portions, attached to a part of the fourth surface, and bonded at the other end thereof to the other of first and second portions.

The battery may further include a first adhesive layer disposed between the first portion of the outer cover layer and the pouch to combine the first portion and the pouch.

The battery may further include a second adhesive layer disposed between the second surface of the jelly-roll structure and the pouch to combine the second portion and the pouch through an opening of the second portion.

The battery may further include a third adhesive layer disposed between the second portion of the outer cover layer and the pouch to combine the second portion and the pouch.

Each of the first and third adhesive layers may include a material exhibiting an adhesive property by a specific mechanism.

Each of the first and third adhesive layers may include oriented polystyrene (OPS).

The second adhesive layer may include a material exhibiting an adhesive property by a specific mechanism.

The outer cover layer may be formed of polyethylene terephthalate (PET).

While the present disclosure has been particularly shown and described with reference to example embodiments thereof, it is clearly understood that the same is by way of illustration and example only and is not to be taken in conjunction with the present disclosure. It will be understood by those skilled in the art that various changes in form and details may be made therein without departing from the subject matter of the present disclosure.

What is claimed is:

1. An electronic device, comprising:
    a battery including:
        a jelly-roll structure including a cathode, a separator, and an anode, the cathode, the separator and the anode wound about a rectangular plane,
        a first polymeric layer, and
        a pouch sealing the jelly-roll structure and the first polymeric layer,
    wherein the jelly-roll structure includes:
        a first surface facing a first direction, the first surface parallel with the rectangular plane,
        a second surface facing a second direction opposite the first direction,
        a third surface connecting the first surface and the second surface, the third surface facing a third direction perpendicular to the rectangular plane, the first direction, and the second direction, and
        a fourth surface connecting the first surface and the second surface, the fourth surface facing a fourth direction opposite the third direction, and
    wherein the first polymeric layer includes:
        a first portion attached to substantially an entire area of the first surface,
        a second portion defining a first opening, the second portion attached to the second surface such that the first opening exposes an adhesive disposed on the second surface of the jelly-roll structure,
        a third portion that is foldable to attach to a part of the third surface, and connecting the first portion and the second portion, wherein the third portion includes at least one second opening exposing some of the third surface when the third portion is folded, and
        a fourth portion attached to a part of the fourth surface, and connecting the first portion and the second portion.

2. The electronic device of claim 1, wherein the battery further comprises: a second polymeric layer disposed between the first portion of the first polymeric layer a nd the pouch, the second polymeric layer attached to the first portion and the pouch and formed of a different material from the first polymeric layer, wherein the third portion is foldable along a first edge connecting with the first portion, and a second edge connecting with the second portion, and wherein folding of the third portion along the first edge causes the third portion to be attached to the part of the third surface, and folding of the third portion along the second edge causes the second portion to be attached to the second surface to expose the adhesive through the first opening.

3. The electronic device of claim 2, wherein the battery further comprises:
    a third polymeric layer disposed between the second surface of the jelly-roll structure and the pouch, the third polymeric layer attached to the second surface and the pouch through the first opening and formed of a same material as the second polymeric layer.

4. The electronic device of claim 3, wherein the battery further comprises:
    a fourth polymeric layer disposed between the second portion of the first polymeric layer and the pouch, the fourth polymeric layer attached to the second portion and the pouch and formed of a same material as the third polymeric layer.

5. The electronic device of claim 4, wherein each of the second, third, and fourth polymeric layers includes oriented polystyrene (OPS).

6. The electronic device of claim 1, wherein the first polymeric layer is formed of polyethylene terephthalate (PET).

7. The electronic device of claim 4, wherein the first polymeric layer is attached to at least one of the first, second, third, and fourth surfaces through a rubber-based adhesive.

8. A battery, comprising:
a jelly-roll structure including a stack of a cathode, a separator, and an anode which are disposed in a rolled stack;
an outer cover layer enclosing at least some surfaces of the jelly-roll structure; and
a pouch sealing the jelly-roll structure and the outer cover layer,
wherein the jelly-roll structure includes:
a first surface,
a second surface disposed in a direction opposite to the first surface,
a third surface corresponding to a first side of the rolled stack of the jelly-roll structure, the third surface connecting the first surface and the second surface, and
a fourth surface corresponding to a second side of the rolled stack of the jelly-roll structure, the fourth surface connecting the first surface and the second surface and disposed in a direction opposite to the third surface, and
wherein the outer cover layer includes:
a first portion bonded to the first surface,
a second portion bonded to the second surface, the second portion defining a first opening, exposing an adhesive disposed on the second surface of the jelly-roll structure,
a third portion that is foldable to be bonded to a part of the third surface and connected to the first and second portions, wherein the third portion includes at least one second opening exposing some of the third surface when the third portion is folded, and
a fourth portion bonded to a part of the fourth surface.

9. The battery of claim 8, wherein the jelly-roll structure is formed by rolling a stack of a cathode, a separator and an anode around a virtual rectangular plane as an axis, wherein the third portion is foldable along a first edge connecting with the first portion, and a second edge connecting with the second portion, and wherein folding of the third portion along the first edge causes the third portion to be attached to the part of the third surface, and folding of the third portion along the second edge causes the second portion to be attached to the second surface to expose the adhesive through the first opening.

10. The battery of claim 8, wherein the second portion of the outer cover layer defines another opening exposing a part of the second surface of the jelly-roll structure.

11. The battery of claim 8, wherein the third portion of the outer cover layer is bonded to the third surface, the third portion exposing a part of the third surface while covering an edge of the third surface connected to at least one of the first or second surface.

12. The battery of claim 8, wherein the third portion of the outer cover layer defines a hole through which a part of the third surface is exposed, and
wherein the hole is smaller than a thickness of the jelly-roll structure such that the third portion of the outer cover layer covers at least one of a first edge disposed between the third and first surfaces, and a second edge disposed between the third and second surfaces.

13. The battery of claim 8, wherein the fourth portion of the outer cover layer is formed at a first end integrally with a particular portion of one of the first and second portions, the fourth portion attached to a part of the fourth surface, and bonded at a second end to the other portion different from the particular portion of the first and second portions, and wherein the fourth portion includes a plurality of extensions, each pair of the extensions defining a gap.

14. The battery of claim 8, further comprising:
a first adhesive layer disposed between the first portion of the outer cover layer and the pouch, to attach together the first portion and the pouch.

15. The battery of claim 14, further comprising:
a second adhesive layer disposed between the second surface of the jelly-roll structure and the pouch to attach together the second portion and the pouch through an opening of the second portion.

16. The battery of claim 15, further comprising:
a third adhesive layer disposed between the second portion of the outer cover layer and the pouch to attach together the second portion and the pouch.

17. The battery of claim 16, wherein each of the first and third adhesive layers includes a material that develops an adhesive property under a specific condition.

18. The battery of claim 17, wherein each of the first and third adhesive layers include oriented polystyrene (OPS).

19. The battery of claim 15, wherein the second adhesive layer includes a material that develops an adhesive property under a specific condition.

20. The battery of claim 8, wherein the outer cover layer is formed of polyethylene terephthalate (PET).

* * * * *